(12) United States Patent
Matsuura

(10) Patent No.: US 8,189,082 B2
(45) Date of Patent: May 29, 2012

(54) SIGNAL PROCESSING APPARATUS, SOLID-STATE IMAGING DEVICE, AND PIXEL SIGNAL GENERATING METHOD

(75) Inventor: Tomohiro Matsuura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 12/492,589

(22) Filed: Jun. 26, 2009

(65) Prior Publication Data

US 2010/0053389 A1    Mar. 4, 2010

(30) Foreign Application Priority Data

Aug. 28, 2008  (JP) ................. 2008-220504

(51) Int. Cl.
 *H04N 3/14* (2006.01)
 *H04N 5/335* (2006.01)
 *H03K 3/356* (2006.01)
(52) U.S. Cl. ............... 348/294; 348/300; 327/210
(58) Field of Classification Search .......... None
 See application file for complete search history.

(56) References Cited

U.S. PATENT DOCUMENTS

| 7,176,462 B2 | 2/2007 | Mabuchi | |
| 7,679,665 B2* | 3/2010 | Egawa et al. | 348/305 |
| 2004/0233310 A1* | 11/2004 | Egawa et al. | 348/301 |
| 2005/0030399 A1* | 2/2005 | Suzuki et al. | 348/294 |

FOREIGN PATENT DOCUMENTS

| JP | 2005-86595 | 3/2005 |
| JP | 2007-124344 | 5/2007 |
| JP | 2009-267541 | 11/2009 |
| JP | 2009-296476 | 12/2009 |

OTHER PUBLICATIONS

Office Action issued Oct. 26, 2010, in Japan Patent Application No. 2008-220504 (with English translation).
Keiji Mabuchi et al., "CMOS Image Sensors Comprised of Floating Diffusion Driving Pixels With Buried Photodiode", IEEE Journal of Solid-State Circuits, vol. 39, No. 12, Dec. 2004, pp. 2408-2416.

* cited by examiner

*Primary Examiner* — Lin Ye
*Assistant Examiner* — Euel Cowan
(74) *Attorney, Agent, or Firm* — Oblon, Spivak, McClelland, Maier & Neustadt, L.L.P.

(57) ABSTRACT

To provide a floating diffusion (FD) for converting accumulated electric charges to a voltage signal and a transistor in which a gate terminal is connected to the FD and a source terminal is connected to an output signal line. When the FD is reset, a power supply voltage is applied to the FD for a predetermined period to set a voltage of the output signal line as a first voltage, and thereafter, the set voltage of the output signal line is set as a second voltage higher than the first voltage.

14 Claims, 11 Drawing Sheets

US 8,189,082 B2

SIGNAL PROCESSING APPARATUS, SOLID-STATE IMAGING DEVICE, AND PIXEL SIGNAL GENERATING METHOD

CROSS-REFERENCE TO RELATED APPLICATIONS

This application is based upon and claims the benefit of priority from the prior Japanese Patent Application No. 2008-220504, filed on Aug. 28, 2008; the entire contents of which are incorporated herein by reference.

BACKGROUND OF THE INVENTION

1. Field of the Invention

The present invention relates to a signal processing apparatus that outputs a voltage signal corresponding to electric charges accumulated in a photodiode in a wide dynamic range, and also to a solid-state imaging device and a pixel signal generating method.

2. Description of the Related Art

A complementary metal oxide semiconductor (CMOS) image sensor, which is one type of solid-state imaging devices, resets a floating diffusion (FD) voltage to a pixel supply voltage at the time of reading a pixel signal. That is, because the CMOS image sensor has supply voltage dependency, if the pixel supply voltage decreases, the FD voltage also decreases. Further, a signal output to a vertical signal line is a signal obtained by detecting the FD voltage by an amplifier transistor. Therefore, if the FD voltage decreases, the voltage of an output signal to the vertical signal line also decreases. Accordingly, in a device including a CMOS image sensor, when it is attempted to realize reduction of power consumption, there is a problem that a saturated signal amount of a pixel cannot be output sufficiently.

Meanwhile, Japanese Patent Application Laid-Open No. 2005-86595 discloses a semiconductor device (a CMOS sensor) that attempts to solve the above problem and to realize reduction of power consumption and expansion of dynamic range. According to this semiconductor device, a period during which a reset pulse is being turned on at the time of resetting an FD is set shorter than usual (sufficiently shortened with respect to a transit time of a vertical signal line), to increase a preset voltage to the FD, thereby realizing reduction of power consumption and expansion of dynamic range.

However, in the semiconductor device of Japanese Patent Application Laid-Open No. 2005-86595, because an increase width of the preset voltage depends on its control timing, there is a problem that it is difficult to control the voltage at an optimum timing at which a sufficient effect can be obtained. Further, in a case of a CMOS sensor having a large number of pixels, a waveform of the reset pulse becomes dull due to a resistor-capacitor (RC) time constant. Therefore, to reset the FD, the pulse width needs to be widened, and when the pulse width is widened, its voltage rise effect is lessened. Accordingly, it is difficult to apply the technique described in Japanese Patent Application Laid-Open No. 2005-86595 to a CMOS sensor having a large number of pixels. In addition, because a voltage rise effect varies according to a load capacity of a vertical signal line, when the load capacity of the vertical signal line is small, the transit time of the vertical signal line is also shortened, and therefore a sufficient voltage rise effect cannot be obtained.

BRIEF SUMMARY OF THE INVENTION

A signal processing apparatus according to an embodiment of the present invention comprises a floating diffusion (FD) for converting the accumulated electric charges to a voltage signal; and a transistor in which a gate terminal is connected to the FD and a source terminal is connected to an output signal line, and when the FD is reset in the correlated double sampling process, a power supply voltage is applied to the FD for a predetermined period to set a voltage of the output signal line as a first voltage, and thereafter, the set voltage of the output signal line is set as a second voltage higher than the first voltage.

A solid-state imaging device according to an embodiment of the present invention comprises a plurality of pixel cells arranged in an array, a load circuit connected to each of the pixel cells, and a row selecting circuit that selects a pixel cell to be processed from the pixel cells, wherein each of the pixel cell includes a photodiode; an FD for converting electric charges accumulated in the photodiode to a voltage signal; an amplifier transistor in which a gate terminal is connected to the FD and a source terminal is connected to an output signal line; and a reset transistor in which a source terminal is connected to the FD, and in a reset process of the FD at a time of performing a correlated double sampling process, a power supply voltage is applied to the FD for a predetermined period by controlling the reset transistor to set a voltage of the output signal line as a first voltage, and thereafter, the set voltage of the output signal line is set as a second voltage higher than the first voltage by controlling the load circuit.

A pixel signal generating method according to an embodiment of the present invention comprises setting a voltage of a source terminal of a transistor as a first voltage, whose gate terminal is connected to an FD for converting the accumulated electric charges to a voltage signal, by applying a power supply voltage to the FD for a predetermined period; applying a second voltage higher than the first voltage to the source terminal of the transistor; transferring signal charges accumulated in the photodiode to the FD; and generating a pixel signal indicating a difference between the second voltage and the voltage of the source terminal of the transistor after performing the transferring.

DETAILED DESCRIPTION OF THE INVENTION

Exemplary embodiments of a signal processing apparatus, a solid-state imaging device, and a pixel signal generating method according to the present invention will be explained below in detail with reference to the accompanying drawings. The present invention is not limited to the embodiments.

Figure 1:
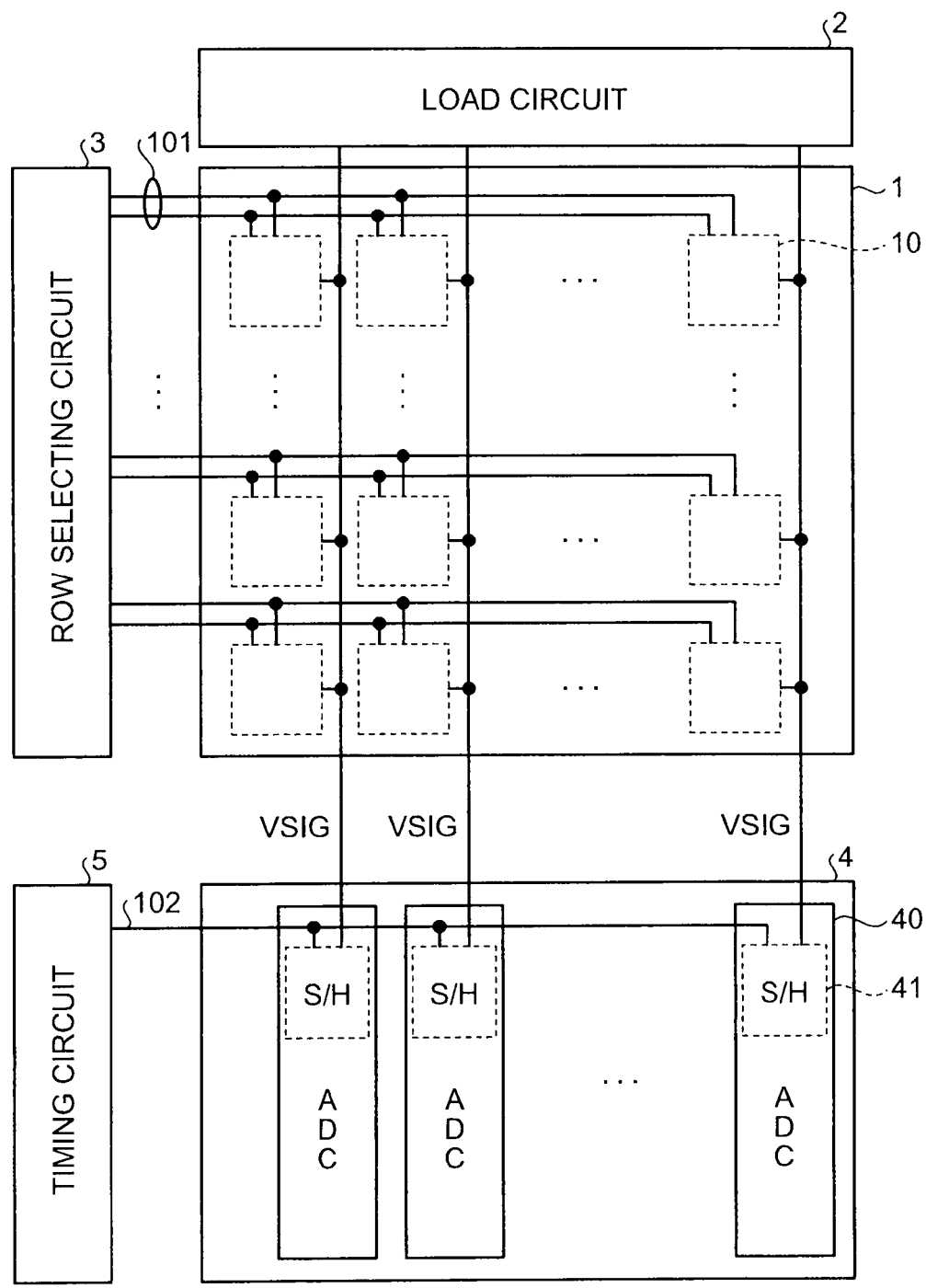
FIG. 1 is a configuration example of a solid-state imaging device that is a prerequisite to a solid-state imaging device according to the present invention.

A prerequisite technique of the present invention is explained first before explaining a characteristic operation in a solid-state imaging device according to a first embodiment of the present invention. FIG. 1 is a configuration example of a solid-state imaging device that is a prerequisite to the solid-state imaging device of the present invention. The solid-state imaging device is a 3Tr-type CMOS image sensor, which includes a pixel area 1, a load circuit 2, a row selecting circuit 3, a column ADC block 4, and a timing circuit 5. A plurality of pixel cells 10 are arranged in an array in the pixel area 1. The column ADC block 4 includes a plurality of AD converters (ADC) 40 corresponding to columns of the pixel cells 10 in the pixel area 1. Each of the AD converters includes a sample-and-hold circuit (S/H) 41.

The respective pixel cells 10 are connected to the row selecting circuit 3 by a control signal line 101 (reset signal line and read signal line). The row selecting circuit 3 controls the control signal line 101, thereby selecting the pixel cell (a row of the pixel cell) that performs read. The selected pixel cell 10 outputs a pixel signal to a vertical signal line (VSIG). One end of the vertical signal line is connected to the load circuit 2, and the other end is connected to the AD converter 40 in the column ADC block 4. The pixel signal read from the pixel cell 10 is transmitted to the sample-and-hold circuit 41 in the AD converter 40.

The respective AD converters 40 are connected to the timing circuit 5 by a signal line 102 (sampling signal line), and the sample-and-hold circuit 41 in the AD converter 40 samples the vertical signal line according to an instruction received from the timing circuit 5 via the signal line 102. As a result, a pixel signal in a digital format (digital pixel signal) is read from the pixel cell 10.

Figure 2:
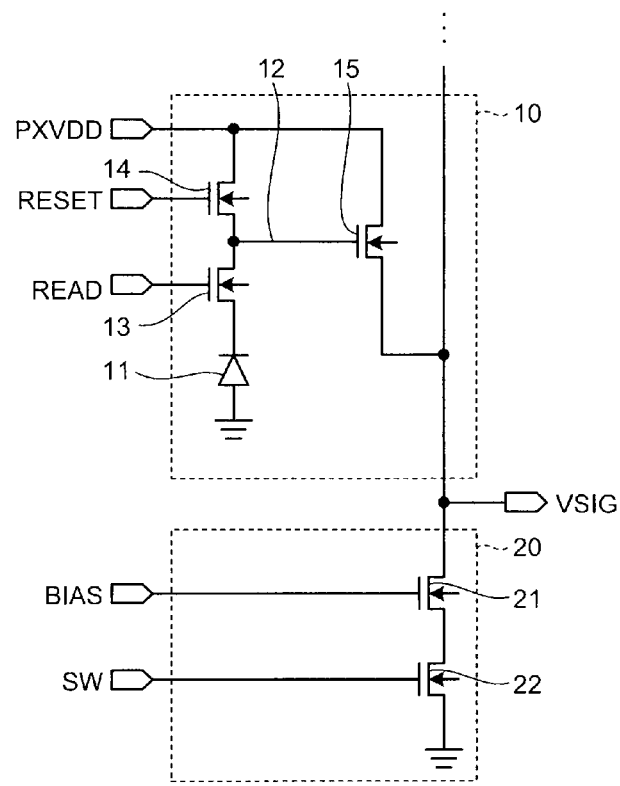
FIG. 2 depicts a configuration of a circuit for reading a pixel signal (a pixel signal read circuit) from a pixel cell.

A detailed operation of the solid-state imaging device shown in FIG. 1 is explained next. FIG. 2 depicts a configuration of a circuit for reading the pixel signal (pixel signal read circuit) from one specific pixel cell 10 in the pixel area 1 in the solid-state imaging device. The circuit includes the pixel cell 10 and a load circuit (hereinafter, "load circuit 20") connected thereto.

The pixel cell 10 includes a photodiode 11, a floating diffusion (FD) 12 that converts the electric charge accumulated in the photodiode 11 to a voltage, a read transistor 13 that reads out the electric charge accumulated in the photodiode 11 into the FD 12, a reset transistor 14 that resets the voltage of the FD 12, and an amplifier transistor 15 that outputs the voltage of the FD 12. A source terminal of the amplifier transistor 15 is connected to the VSIG, and a drain terminal of the amplifier transistor 15 and a drain terminal of the reset transistor 14 are connected to a pixel power supply (PXVDD). The read transistor 13 and the reset transistor 14 are controlled by the row selecting circuit 3 shown in FIG. 1.

The load circuit 20 includes a load transistor 21 in which a gate terminal is applied with a bias voltage and a drain terminal is connected to the vertical signal line, and a switching transistor 22 serially connected thereto to control on/off of electric current, in which a control signal (switching signal) is input to the gate terminal and the source terminal is connected to a substrate (reference potential point). In the circuit shown in FIG. 2, the load circuit 20 and the amplifier transistor 15 in the pixel cell 10 function as a source follower. The load transistor 21 and the switching transistor 22 are controlled by a load circuit controller (not shown).

Figure 3:
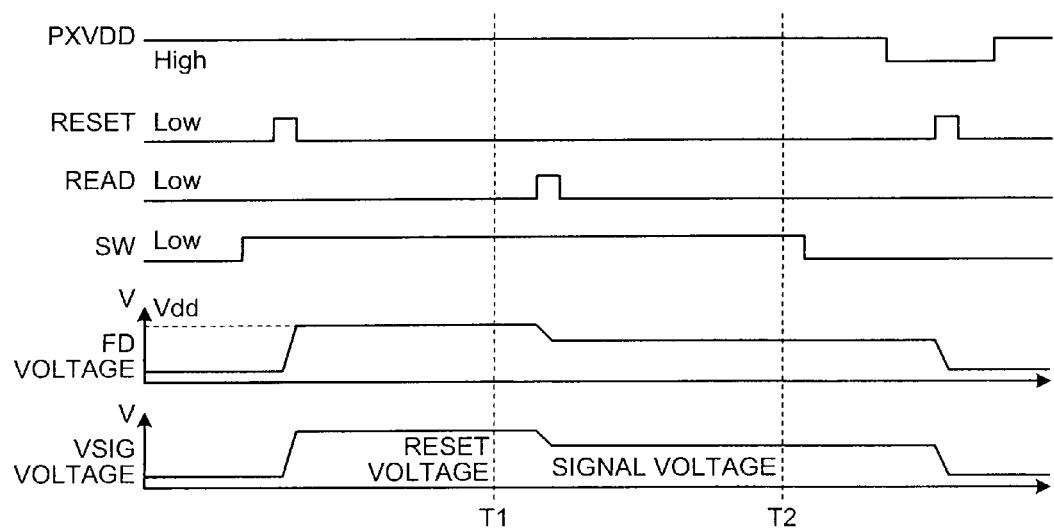
FIG. 3 is an example of a timing chart when a pixel signal is read by using the pixel signal read circuit shown in FIG. 2.

FIG. 3 is an example of a timing chart when the pixel signal is read by using the circuit shown in FIG. 2. A pixel signal read operation in the solid-state imaging device is explained with reference to FIG. 3. When the pixel signal is read in the apparatus, a power supply voltage is applied to the pixel power supply (PXVDD), and the bias voltage is applied to the load transistor 21 in the load circuit 20 for making it operate as a constant current source. If the reset transistor 14 is turned on for a predetermined period in this state, the voltage of the FD 12 increases to finally become Vdd. It is assumed that the "predetermined period" has a sufficient length of time for the voltage of the FD 12 to become Vdd. At this time, the switching transistor 22 in the load circuit 20 is turned on. Accordingly, the current flows into the source follower, and a voltage value shifted by a certain amount from the voltage (Vdd) set to the FD 12 is output to the VSIG (corresponding to the "reset voltage" shown in FIG. 3). A sample-and-hold circuit (the sample-and-hold circuit 41 shown in FIG. 1) samples the reset voltage (VSIG voltage) at a timing Ti shown in FIG. 3. The state in which the switching transistor 22 is turned on is maintained for a certain period of time.

When sampling of the reset voltage is finished, the read transistor 13 is turned on for a predetermined period. The signal charges accumulated in the photodiode 11 are then transferred to the FD 12. It is assumed that the "predetermined period" is a length of time capable of transferring all the signal charges accumulated in the photodiode 11 to the FD 12. The signal charges transferred to the FD 12 are detected by the amplifier transistor 15 and output to the VSIG (corresponding to "signal voltage" shown in FIG. 3). The sample-and-hold circuit 41 samples the signal voltage at a timing T2.

When sampling of the signal charge (signal voltage) is finished, the switching transistor 22 in the load circuit 20 is turned off to cut the current following into the source follower. The pixel power supply (PXVDD) is reduced to a low level, and the reset transistor 14 is turned on in this state. Accordingly, the voltage of the FD 12 is set to the same state (low level) as the pixel power supply, and the amplifier transistor 15 becomes an off state to complete the pixel signal read operation. The low level of the pixel power supply is assumed to be at a voltage level sufficient for turning off the amplifier transistor 15. The pixel cell 10 is substantially a deselected pixel because the amplifier transistor 15 is turned off. The pixel power supply is controlled by, for example, a pixel power supply controller (not shown).

In the CMOS image sensor, by removing a difference between the reset voltage sampled by the sample-and-hold circuit 41 and the signal voltage, fixed pattern noise resulting from a threshold difference or the like of the amplifier transistor is removed. Noise components due to a difference or the like of the transistor are generated in the reset voltage. However, because such noise components are constant timewise and do not change, equivalent noise components are included in the signal voltage. Therefore, by removing the difference between the reset voltage and the signal voltage, a signal component in which the fixed pattern noise is removed (a voltage signal corresponding to the signal charges accumulated in the photodiode 11) can be obtained. Such signal processing is generally referred to as correlated double sampling. The AD converter 40 outputs an amount of differential signal as a digital value.

Figure 4:
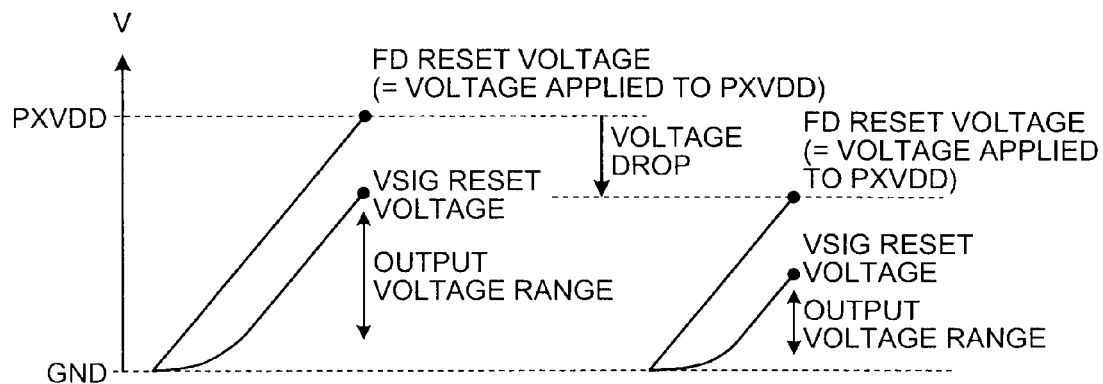
FIG. 4 depicts a relation between a reset voltage of an FD and a reset voltage of a vertical signal line.

Thus, the signal voltage output to the VSIG depends on the reset voltage, that is, the pixel power supply (PXVDD). Therefore, if the power supply voltage applied to the pixel power supply decreases, the reset voltage of the FD 12 also decreases, and the signal voltage output from the pixel signal read circuit decreases as well. As a result, an output voltage range of the pixel signal read circuit becomes narrow as shown in FIG. 4, and thus sufficient output amplitude (dynamic range) cannot be obtained. Therefore, in the solid-stage imaging device according to the present invention, the output amplitude is expanded by temporarily changing the voltage of the vertical signal line in a reset process of the floating diffusion at the time of reading the pixel signal. FIG. 4 depicts a relation between the reset voltage of the FD 12 and the reset voltage of the vertical signal line.

Figure 5:
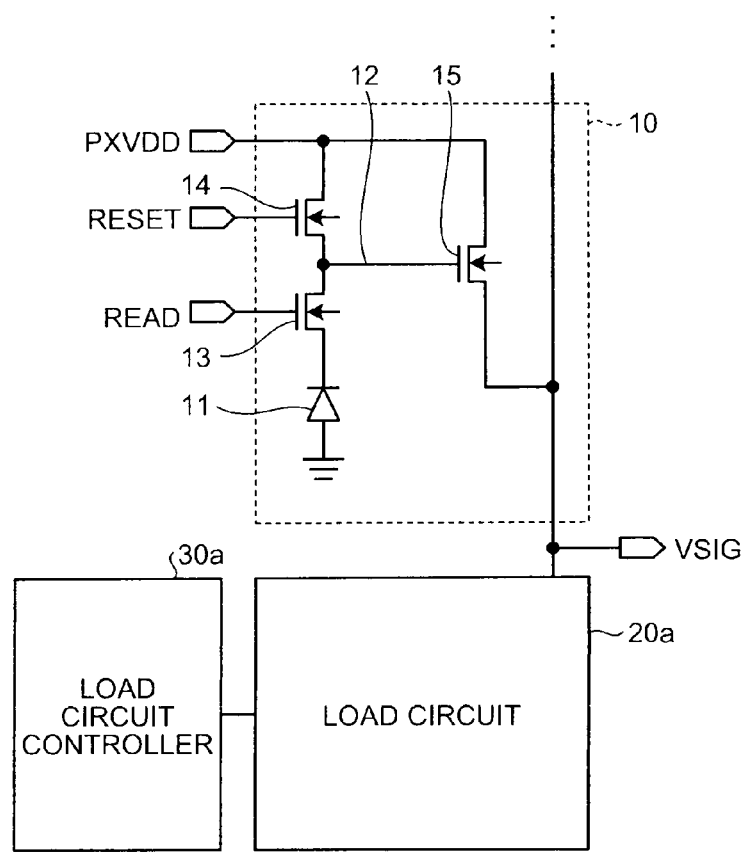
FIG. 5 is a configuration example of a pixel signal read circuit provided in a solid-stage imaging device according to a first embodiment of the present invention.

Subsequently, an operation of the solid-stage imaging device according to the first embodiment using the prerequisite technique is explained. FIG. 5 is a configuration example of the pixel signal read circuit provided in the solid-stage imaging device according to the first embodiment, in which the load circuit 20 in the pixel signal read circuit shown in FIG. 2 is replaced by a load circuit 20a, and the load circuit controller omitted in FIG. 2 is added as a load circuit controller 30a. The pixel cell 10 is the same as the pixel cell 10 in the pixel signal read circuit shown in FIG. 2. Detailed explanations of the pixel cell 10, which has been explained above, will be omitted, and the load circuit 20a and the operation of the load circuit controller 30a that controls the load circuit 20a are mainly explained. An overall configuration of the solid-state imaging device including the pixel signal read circuit is the same as that of the solid-state imaging device shown in FIG. 1.

Figure 6:
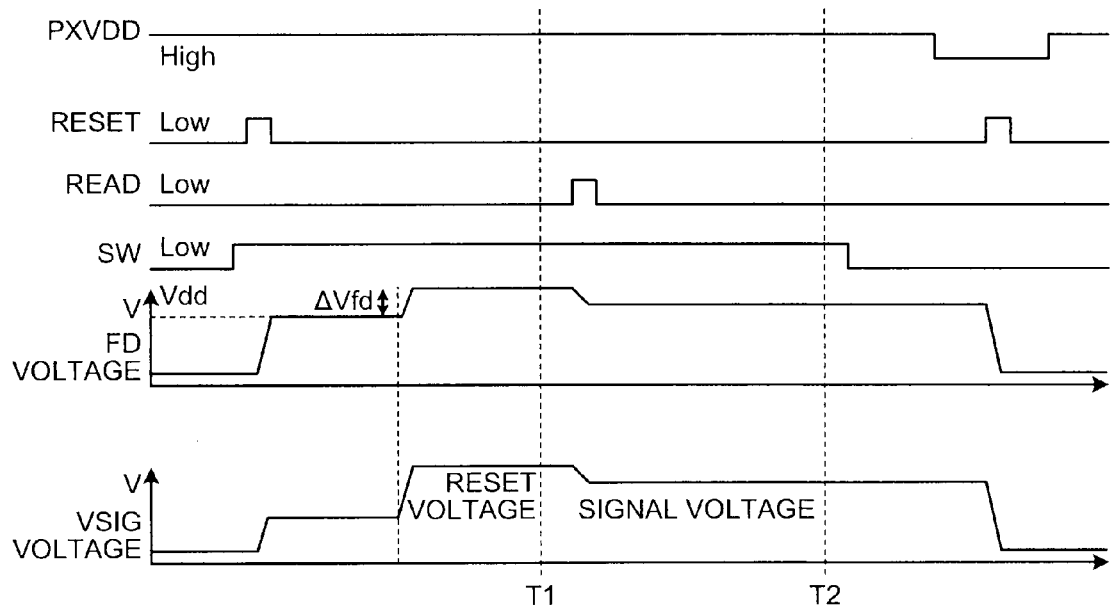
FIG. 6 is an example of a timing chart when a pixel signal is read by using a pixel signal read circuit shown in FIG. 5.

FIG. 6 is an example of a timing chart when the pixel signal is read by using the pixel signal read circuit shown in FIG. 5. A pixel signal read operation in the solid-state imaging device according to the first embodiment is explained with reference to FIG. 6. When the pixel signal is read in the solid-state imaging device, the power supply voltage is first applied to the pixel power supply (PXVDD), and the load circuit controller 30a controls the load circuit 20a which operate as a constant current source so that the VSIG becomes a predetermined voltage (first voltage). In this state, the reset transistor 14 is turned on, to set the voltage of the FD 12 as Vdd (power supply voltage), which is a voltage applied to the pixel power supply. After the voltage of the FD 12 is set as Vdd, the load circuit controller 30a changes setting so that an output of the load circuit 20a to the vertical signal line becomes a second voltage (reset voltage shown in FIG. 6) higher than the first voltage set previously. As a result, the voltage of the FD 12 is reset to a voltage higher than Vdd by ΔVfd.

Figure 7:
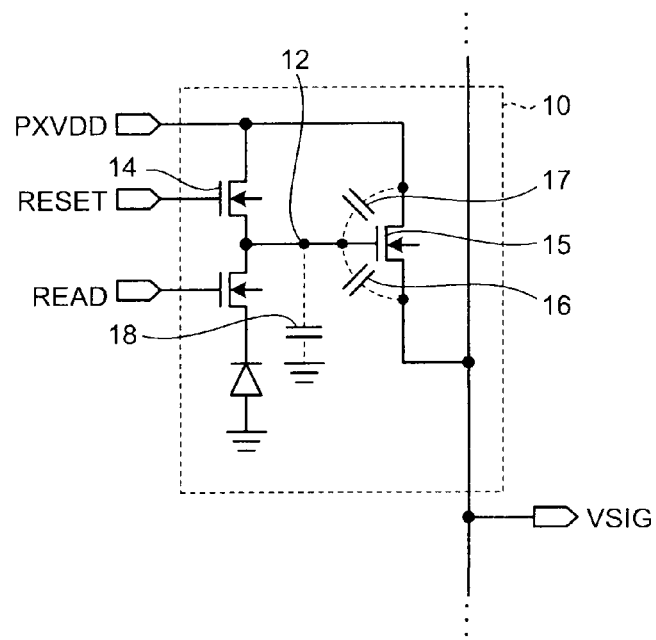
FIG. 7 depicts a relation between an FD and an a signal voltage output to a vertical signal line.
Figure 8:
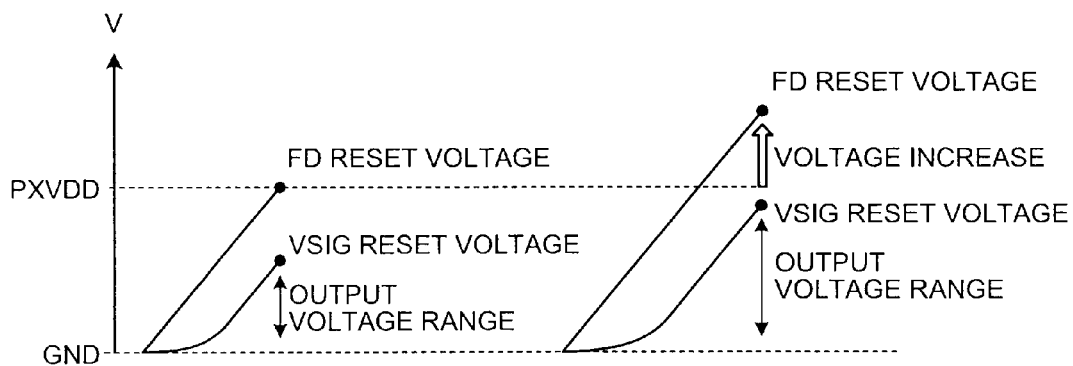
FIG. 8 depicts a comparison between a reset voltage of an FD in a solid-state imaging device according to a conventional technique and a reset voltage of an FD in a solid-state imaging device according to the first embodiment.

As shown in FIG. 7, in the pixel cell 10, the FD 12 is capacitively coupled with the vertical signal line via a gate-source capacitance 16 (Cgs) of the amplifier transistor 15. Accordingly, the voltage of the FD 12 increases synchronously with an increase of the voltage of the vertical signal line. In the solid-state imaging device according to the first embodiment, by increasing the voltage of the vertical signal line using this property after setting the voltage of the FD 12 to the pixel power supply (PXVDD) at the time of a resetting operation, the set voltage of the FD 12 is increased even when the power supply voltage same as a conventional one is used (see FIG. 8). An amount of voltage increase of the FD 12 is determined by an amount of voltage change (ΔVsig) of the vertical signal line, coupled capacitance values 16 (Cgs) and 17 (Cgd) of the amplifier transistor 15, and an internal capacitance 18 (Cfd) of the FD 12 as shown in the following equation (1):

$$\Delta Vfd = \frac{Cgs}{Cfd + Cgd + Cgs} \cdot \Delta Vsig \qquad (1)$$

An operation after the voltage of the FD 12 is increased by ΔVfd by executing the control described above is the same as that of the apparatus explained with reference FIGS. 1 to 3. That is, the reset voltage output to the vertical signal line at the timing T1 shown in FIG. 6 is sampled by the sample-and-hold circuit 41, and thereafter, the read transistor 13 is turned on to transfer the signal charges accumulated in the photodiode 11 to the FD 12. Accompanying this, the signal voltage output to the vertical signal line is re-sampled by the sample-and-hold circuit 41. After sampling has finished, the internal setting of the load circuit 20a is changed to cut the current flowing into the source follower, the pixel power supply (PXVDD) is decreased to the low level, and the reset transistor 14 is turned on, thereby turning off the amplifier transistor 15 (the pixel cell is in a deselected state).

Figure 9:
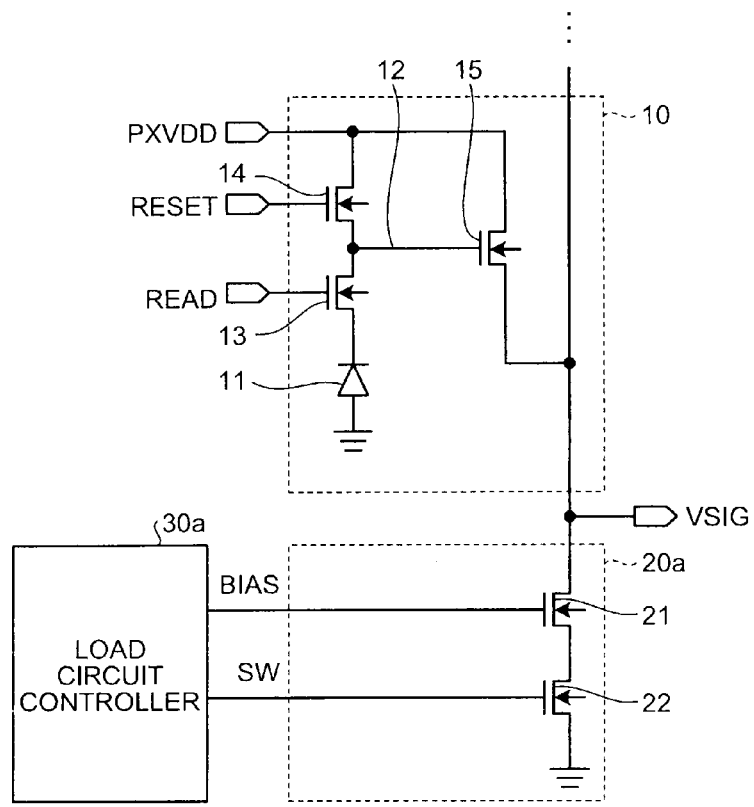
FIG. 9 is an internal configuration example of a load circuit in a pixel signal read circuit provided in the solid-state imaging device according to the first embodiment.

An internal configuration of the load circuit 20a for realizing the control shown in FIG. 6 is explained next in detail. FIG. 9 is an internal configuration example of the load circuit 20a. For the sake of explanation, the entire pixel signal read circuit is shown. As shown in FIG. 9, the load circuit 20a has, for example, the same configuration as that of the load circuit 20 (see FIG. 2) in the pixel signal read circuit. However, the control operation of the load transistor 21 by the load circuit controller 30a is different from that of the pixel signal read circuit.

Figure 10:
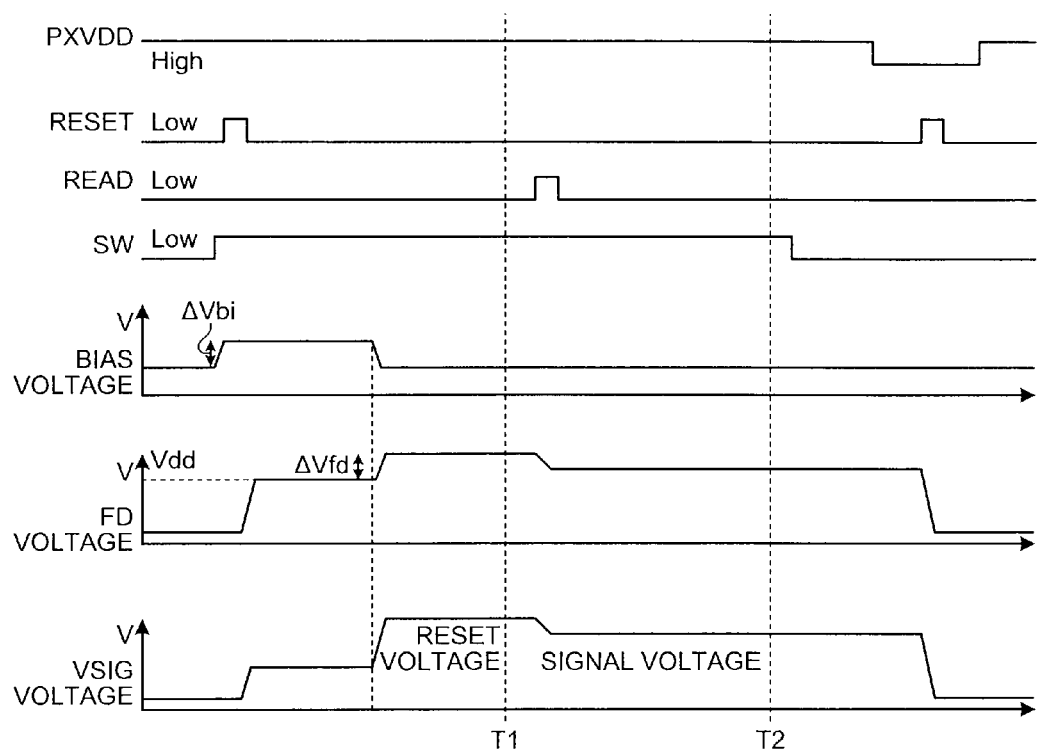
FIG. 10 is an example of a timing chart when a pixel signal is read by using the pixel signal read circuit shown in FIG. 9.

FIG. 10 is an example of a timing chart when the pixel signal is read by using the pixel signal read circuit shown in FIG. 9. The pixel signal read operation in the solid-state imaging device is explained with reference to FIG. 10. In FIG. 10, a fluctuation state of the bias voltage (BIAS voltage) is added to the timing chart shown in FIG. 6.

When the pixel signal is read by using the pixel signal read circuit shown in FIG. 9, the power supply voltage is first applied to the pixel power supply (PXVDD), and the load circuit controller 30a applies the bias voltage to the load transistor 21 for making it operate as the constant current source (hereinafter, "first bias voltage"). A value of the bias voltage applied at this time is the same as that of the bias voltage applied to the load transistor 21 in the pixel signal read circuit (see FIGS. 2 and 3). The load circuit controller 30a increases the bias voltage applied to the load transistor 21 from the first bias voltage to a second bias voltage by a predetermined amount (ΔVbi). In the pixel cell 10, the reset transistor 14 is turned on for a predetermined period in this state, thereby setting the voltage of the FD 12 to the power supply voltage. At this time, the load circuit controller 30a turns on the switching transistor 22 in the load circuit 20. Accordingly, the current flows into the source follower, and a voltage value shifted from the voltage (Vdd) set to the FD 12 by a certain amount is output to the VSIG. The turn-on state of the switching transistor 22 is maintained for a predetermined period (until the read process of the signal voltage finishes).

As described above, a bias voltage higher than a normal voltage value (corresponding to the voltage value applied to the load transistor 21 in the pixel signal read circuit shown in FIG. 2) by ΔVbi is applied to the load transistor 21. Therefore, the current larger than normal flows into the source follower, and the voltage of the vertical signal line becomes lower than the normal reset voltage (reset voltage in the pixel signal read circuit shown in FIG. 2 when the power supply voltage having the same value is applied).

The reason why the reset voltage output to the vertical signal line becomes lower than normal is explained next. Generally, an output voltage of the source follower (output voltage to the vertical signal line) is given by the following equation (2), when a substrate bias effect is not taken into consideration.

$$Vsig = Vfd - Vth - \sqrt{\frac{2I}{\beta}} \qquad (2)$$

$$\beta = \frac{W}{L} \mu \cdot Cox$$

In the equation (2), Vth denotes a threshold voltage of a transistor for an amplifier (the amplifier transistor 15), I denotes the current in the source follower, W and L denote a gate width and a gate length of the amplifier transistor, μ denotes mobility of electrons, and Cox denotes a capacity per unit area of a gate oxide film. Therefore, the equation (2) indicates that the output voltage of the source follower takes a value shifted from the FD voltage by a certain voltage, and the shift amount thereof depends on the current value of the source follower. Accordingly, in the pixel signal read circuit shown in FIG. 9 in which the current larger than normal flows into the source follower, the reset voltage output from the vertical signal line takes a value lower than normal.

Returning to the explanation of the operation, when reset of the FD 12 finishes, the load circuit controller 30a returns the bias voltage applied to the load transistor 21 to an original value (decreases the bias voltage by ΔBbi and returns it to the first bias voltage). Because the current flowing into the source follower decreases, the voltage of the vertical signal line (VSIG voltage shown in FIG. 9) increases according to the equation (2). A sample-and-hold circuit (corresponding to the sample-and-hold circuit 41 shown in FIG. 1) performs sampling at the timing T1, setting the voltage after increase as the reset voltage.

Operations thereafter are the same as the operation when using the pixel signal read circuit shown in FIG. 2. That is, after sampling of the reset voltage has finished, the read transistor 13 is turned on, to transfer the signal charges accumulated in the photodiode 11 to the FD 12, and an output (signal voltage) of the vertical signal line fluctuating therewith is sampled at the timing T2. After sampling of the signal voltage has finished, the switching transistor 22 is turned off to cut the current flowing into the source follower, the pixel power supply (PXVDD) is decreased to the low level, and the reset transistor 14 is turned on in this state, thereby turning off the amplifier transistor 15.

As described above, the AD converter 40 in a subsequent stage AD-converts a difference between the sampled reset voltage and the signal voltage (performs correlated double sampling). Therefore, the increased part of the voltage of the VSIG is regarded as an offset and cancelled. That is, an AD conversion result does not vary due to the increase of voltage of the vertical signal line resulting from the above control (the increased part of the voltage does not become an error in the AD conversion result).

Thus, in the solid-state imaging device according to the first embodiment, when the FD is reset, using a fact that the FD voltage is capacitively coupled with the voltage of the vertical signal line via the amplifier transistor that outputs the FD voltage, the FD voltage is first increased to the power supply voltage in the state that a larger current than normal (than ever before) flows into the source follower including the load circuit and the amplifier transistor, the voltage value output to the vertical signal line is then increased by decreasing the current flowing into the source follower to the current value same as normal, thereby increasing the voltage (reset voltage) of the FD to be higher than the power supply voltage. Accordingly, the reset voltage of the FD can be increased while using the power supply voltage same as the conventional one. That is, a wide output voltage range (sufficient dynamic range) can be ensured even at the time of a low voltage operation.

Further, in the solid-state imaging device according to the first embodiment, the dynamic range is not affected by the control timing, the number of pixels, and the load capacity of the vertical signal line.

A solid-state imaging device according to a second embodiment of the present invention is explained next. The configuration of the solid-state imaging device according to the second embodiment is the same as that of the solid-state imaging device according to the first embodiment (see FIG. 1). In the first embodiment, the solid-state imaging device that increases the voltage of the FD by controlling the voltage of the vertical signal line has been explained. Also in the solid-state imaging device according to the second embodiment, the voltage of the FD is increased by controlling the voltage of the vertical signal line. That is, in the solid-state imaging device, a load circuit for controlling the voltage of the vertical signal line in a pixel signal read circuit and a load circuit controller are different from those in the pixel signal read circuit provided in the solid-state imaging device according to the first embodiment (see FIG. 9). In the second embodiment, elements different from those of the first embodiment are mainly explained.

Figure 11:
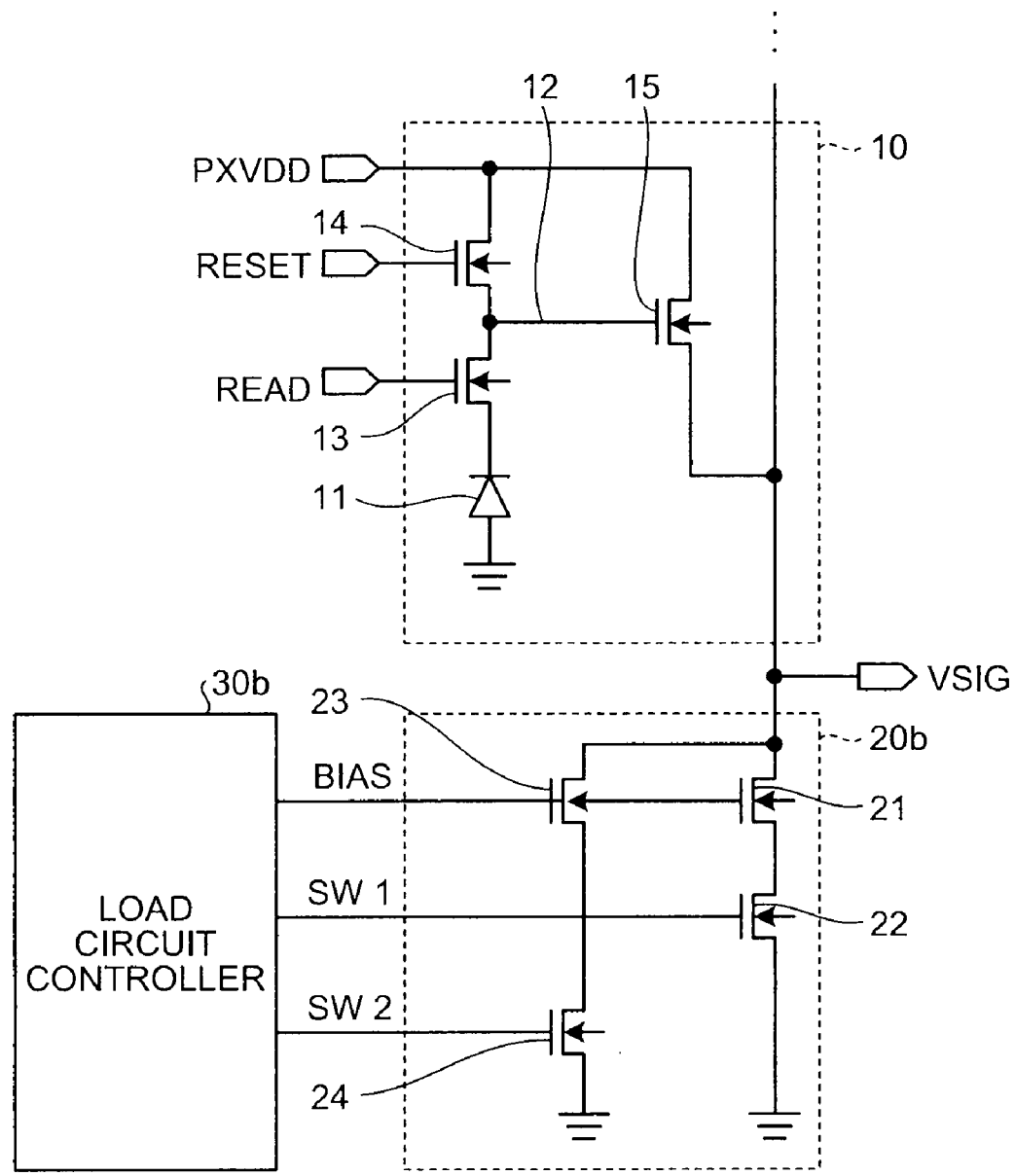
FIG. 11 is a configuration example of a pixel signal read circuit provided in a solid-state imaging device according to a second embodiment of the present invention.

FIG. 11 is a configuration example of the pixel signal read circuit provided in the solid-state imaging device according to the second embodiment. In the pixel signal read circuit, the load circuit 20a and the load circuit controller 30a in the pixel signal read circuit explained in the first embodiment are respectively replaced by a load circuit 20b and a load circuit controller 30b. As shown in FIG. 11, the load circuit 20b includes the load transistor 21 and a load transistor 23 that are turned on when a predetermined bias voltage is applied thereto, and the switching transistor 22 and a switching transistor 24 serially connected in a one-to-one manner to either one of the load transistors 21 and 23 to control on/off of electric current, in which a source terminal thereof is connected to a substrate (reference potential point). Further, gate terminals of the load transistors 21 and 23 are applied with a common voltage (bias voltage), and on/off controlled simultaneously. On the other hand, gate terminals of the switching transistors 22 and 24 are applied with a different voltage as a switching signal, so that on/off control can be performed individually. The load circuit controller 30b controls the load transistors 21 and 23 and the switching transistors 22 and 24 provided in the load circuit 20b.

Figure 12:
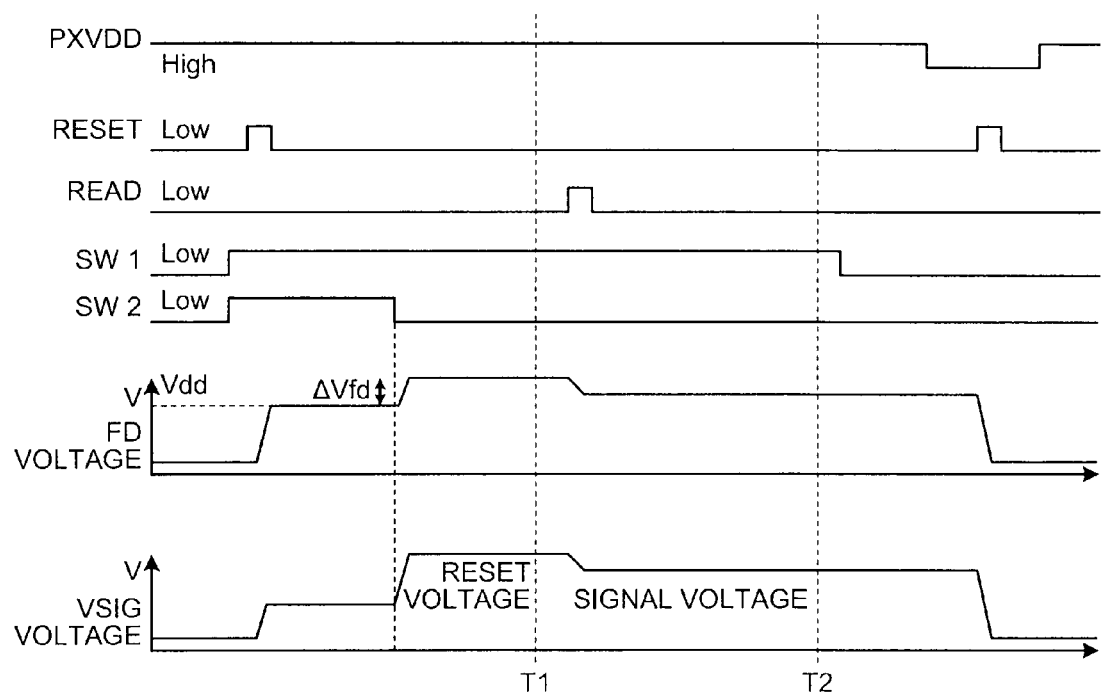
FIG. 12 is an example of a timing chart of a pixel signal read operation in the solid-state imaging device according to the second embodiment.

FIG. 12 is an example of a timing chart of a pixel signal read operation in the solid-state imaging device according to the second embodiment. The pixel signal read operation in the solid-state imaging device is explained below with reference to FIG. 12.

When the pixel signal is read in the solid-state imaging device, the power supply voltage is first applied to the pixel power supply (PXVDD), and the bias voltage is applied to the load transistors 21 and 23 in the load circuit 20b. If the reset transistor 14 is turned on for a predetermined period in this state, the voltage of the FD 12 increases to finally become the power supply voltage (Vdd) applied to the pixel power supply. At this time, the load transistors 21 and 23 in the load circuit 20b are turned on. Accordingly, the current flows into the source follower, and a voltage value shifted by a certain amount from the voltage (Vdd) set to the FD 12 is output to the VSIG.

Because the load circuit 20b drives the current using a plurality of (two) load transistors, a larger current flows into the source follower than in a general configuration (a configuration same as that of the load circuit in the pixel signal read circuit shown in FIG. 2 having a single load transistor). Accordingly, as is obvious from the equation (2), the voltage of the VSIG becomes lower than that in the general configuration.

After the voltage of the FD 12 is set as Vdd, either one of the two switching transistors (in the example shown in FIG. 12, the switching transistor 24) is turned off. The current flowing into the source follower then decreases, and thus the voltage of the vertical signal line (VSIG voltage shown in FIG. 12) increases according to the equation (2). The voltage after the increase is set as the reset voltage and is sampled by the sample-and-hold circuit 41 (see FIG. 1) at the timing T1.

Operations thereafter are the same as those of the solid-state imaging device according to the first embodiment (see FIGS. 9 and 10). That is, after the sampling of the reset voltage has finished, the read transistor 13 is turned on to transfer the signal charges accumulated in the photodiode 11 to the FD 12. Accompanying this, the signal voltage output to the vertical signal line is sampled at the timing T2. After sampling of the signal voltage has finished, the switching transistor in an on state (in the example shown in FIG. 12, the switching transistor 22) is turned off to cut the current flowing into the source follower, the pixel power supply (PXVDD) is decreased to the low level, and the reset transistor 14 is turned on in this state, thereby turning off the amplifier transistor 15.

As described above, in the solid-state imaging device according to the second embodiment, the load circuit includes two load transistors, and when the FD is reset, the two load transistors are first turned on so that a larger current than normal (than in a conventional case in which a single load transistor is used) flows into the source follower, to increase the voltage of the FD to the power supply source. The current flowing into either one of the load transistors is then cut to decrease the current flowing into the source follower to a current value same as normal, thereby increasing the voltage value output to the vertical signal line, and thus the voltage of the FD capacitively coupled with the voltage of the vertical signal line (reset voltage) is increased. Accordingly, the second embodiment can achieve identical effects as those of the first embodiment.

A solid-state imaging device according to a third embodiment of the present invention is explained next. A configuration of the solid-state imaging device according to the third embodiment is the same as that of the solid-state imaging device according to the first embodiment (see FIG. 1). As in the second embodiment, in a pixel signal read circuit provided in the solid-state imaging device according to the third embodiment, a load circuit for controlling the voltage of the vertical signal line and a load circuit controller are different from those in the pixel signal read circuit provided in the solid-state imaging device according to the first embodiment (see FIG. 9). In the third embodiment, elements different from those of the first and second embodiments are mainly explained.

Figure 13:
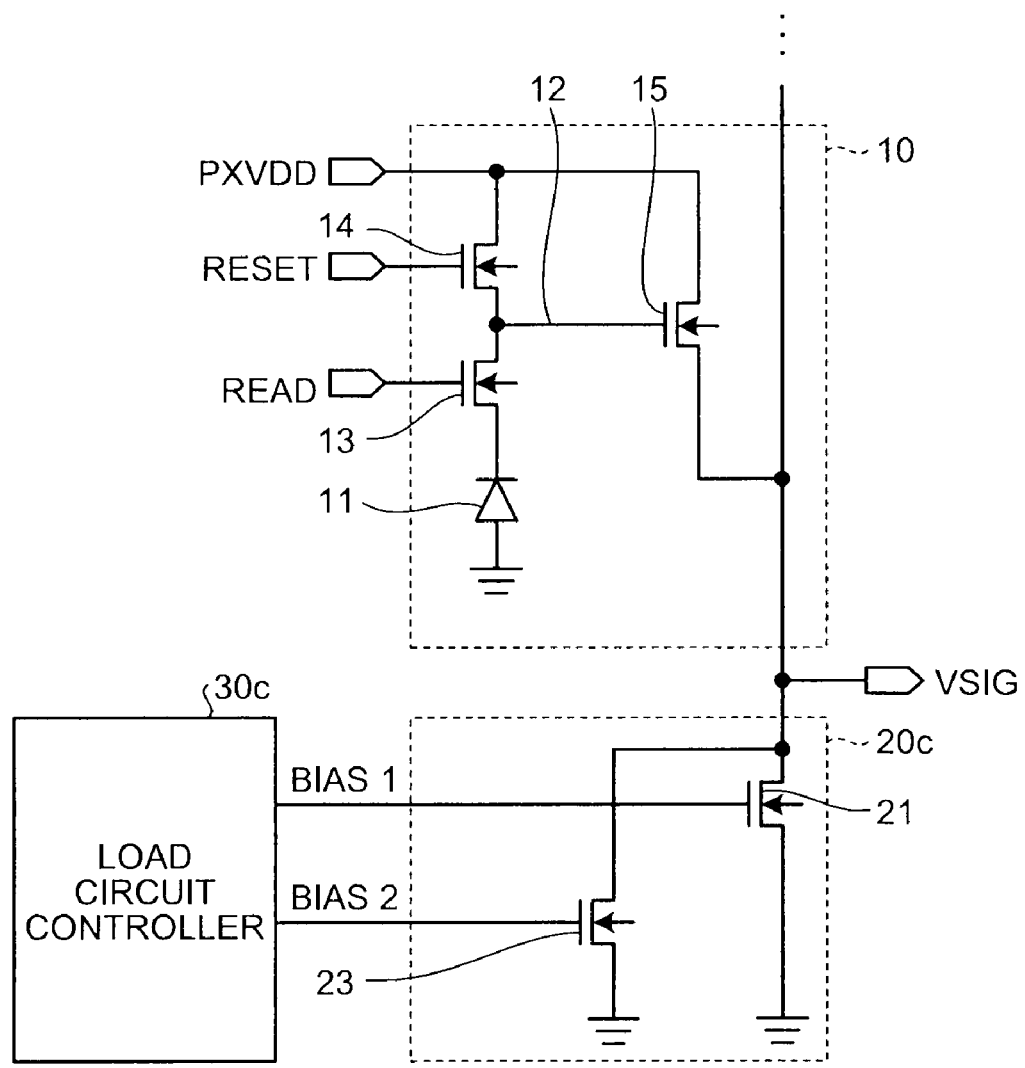
FIG. 13 is a configuration example of a pixel signal read circuit provided in a solid-state imaging device according to a third embodiment of the present invention.

FIG. 13 is a configuration example of the pixel signal read circuit provided in the solid-state imaging device according to the third embodiment. In the pixel signal read circuit, the load circuit 20a and the load circuit controller 30a in the pixel signal read circuit explained in the first embodiment are respectively replaced by a load circuit 20c and a load circuit controller 30c. As shown in FIG. 13, the load circuit 20c includes the load transistors 21 and 23 that are turned on when a predetermined bias voltage is applied thereto. A voltage (bias voltage) different from each other is applied to gate terminals of the respective load transistors so that on/off control can be performed individually. A source terminal of each load transistor is connected to a substrate (reference potential point). The load circuit controller 30c controls the load transistors 21 and 23 provided in the load circuit 20c.

Figure 14:
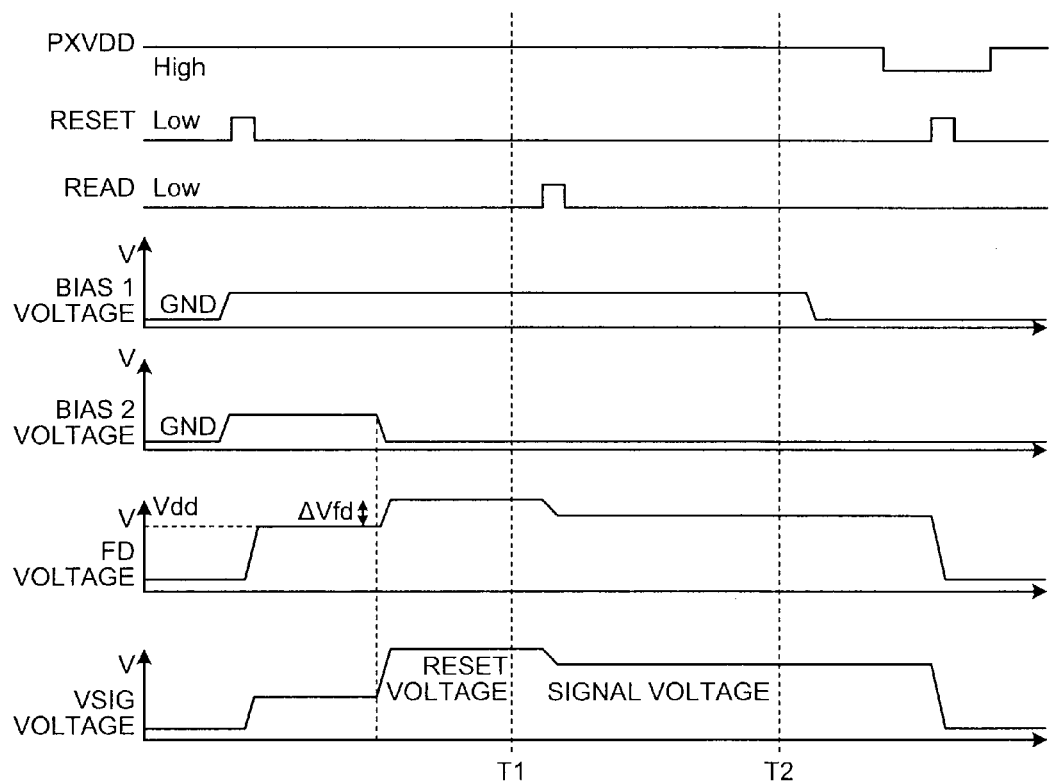
FIG. 14 is an example of a timing chart of a pixel signal read operation in the solid-state imaging device according to the third embodiment.

FIG. 14 is an example of a timing chart of a pixel signal read operation in the solid-state imaging device according to the third embodiment. The pixel signal read operation in the solid-state imaging device is explained below with reference to FIG. 14.

When the pixel signal is read in the solid-state imaging device, the power supply voltage is first applied to the pixel power supply (PXVDD), and the bias voltage is applied to the load transistors 21 and 23 in the load circuit 20c. If the reset transistor 14 is turned on for a predetermined period in this state, the voltage of the FD increases to finally become the power supply voltage (Vdd) applied to the pixel power supply. Further, the current flows into the source follower, and a voltage value shifted by a certain amount from the voltage (Vdd) set to the FD 12 is output to the VSIG.

Because the load circuit 20c drives the current using a plurality of (two) load transistors, a larger current flows into the source follower than in a general configuration (a configuration having a single load transistor), as in the circuit according to the second embodiment. Accordingly, the voltage of the VSIG becomes lower than that in the general configuration.

After the voltage of the FD 12 is set as Vdd, either one of the two load transistors (in the example shown in FIG. 14, the load transistor 23) is turned off (the gate bias voltage is decreased to GND, which is a reference potential). The current flowing into the source follower then decreases, and thus the voltage of the vertical signal line (VSIG voltage) increases, as in the circuit according to the second embodiment. The voltage after the increase (reset voltage) is sampled by the sample-and-hold circuit 41 (see FIG. 1) at the timing T1.

Operations thereafter are the same as those of the solid-state imaging devices according to the first and second embodiments. That is, after the sampling of the reset voltage has finished, the read transistor 13 is turned on to transfer the signal charges accumulated in the photodiode 11 to the FD 12. Accompanying this, the signal voltage output to the vertical signal line is sampled at the timing T2. After sampling of the signal voltage has finished, the load transistor in an on state (in the example shown in FIG. 14, the load transistor 21)

is turned off to cut the current flowing into the source follower, the pixel power supply (PXVDD) is decreased to the low level, and the reset transistor 14 is turned on in this state, thereby turning off the amplifier transistor 15.

As described above, in the solid-state imaging device according to the third embodiment, the load circuit includes two load transistors, and when the FD is reset, the FD voltage is first increased to the power supply voltage in the state that a larger current than normal (than in a conventional case in which a single load transistor is used) flows into the source follower using the two load transistors. The current flowing into either one of the load transistors is cut to decrease the current flowing into the source follower to a current value same as normal, thereby increasing the voltage value output to the vertical signal line, and thus the voltage of the FD capacitively coupled with the voltage of the vertical signal line (reset voltage) is increased. Accordingly, the third embodiment can achieve identical effects as those of the first embodiment.

A solid-state imaging device according to a fourth embodiment of the present invention is explained next. A configuration of the solid-state imaging device according to the fourth embodiment is the same as that of the solid-state imaging device according to the first embodiment (see FIG. 1). As in the second and third embodiments, in a pixel signal read circuit provided in the solid-state imaging device according to the fourth embodiment, a load circuit for controlling the voltage of the vertical signal line and a load circuit controller are different from those in the pixel signal read circuit provided in the solid-state imaging device according to the first embodiment (see FIG. 9). In the fourth embodiment, elements different from the first, second, and third embodiments are mainly explained.

Figure 15:
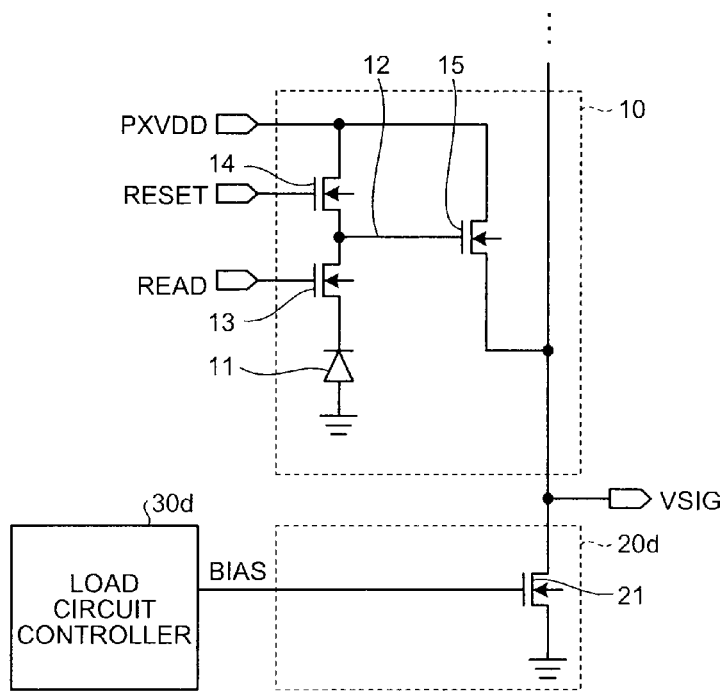
FIG. 15 is a configuration example of a pixel signal read circuit provided in a solid-state imaging device according to a fourth embodiment of the present invention.

FIG. 15 is a configuration example of the pixel signal read circuit provided in the solid-state imaging device according to the fourth embodiment. In the pixel signal read circuit, the load circuit 20a and the load circuit controller 30a in the pixel signal read circuit explained in the first embodiment are respectively replaced by a load circuit 20d and a load circuit controller 30d. As shown in FIG. 15, the load circuit 20d includes the load transistor 21 that is turned on when a predetermined bias voltage is applied thereto. A source terminal of the load transistor 20d is connected to a substrate (reference potential point) That is, the load circuit 20d has a configuration in which the switching transistor 22 is eliminated from the load circuit 20a (see FIG. 9). The load circuit controller 30d controls the load transistor 21 provided in the load circuit 20d.

Figure 16:
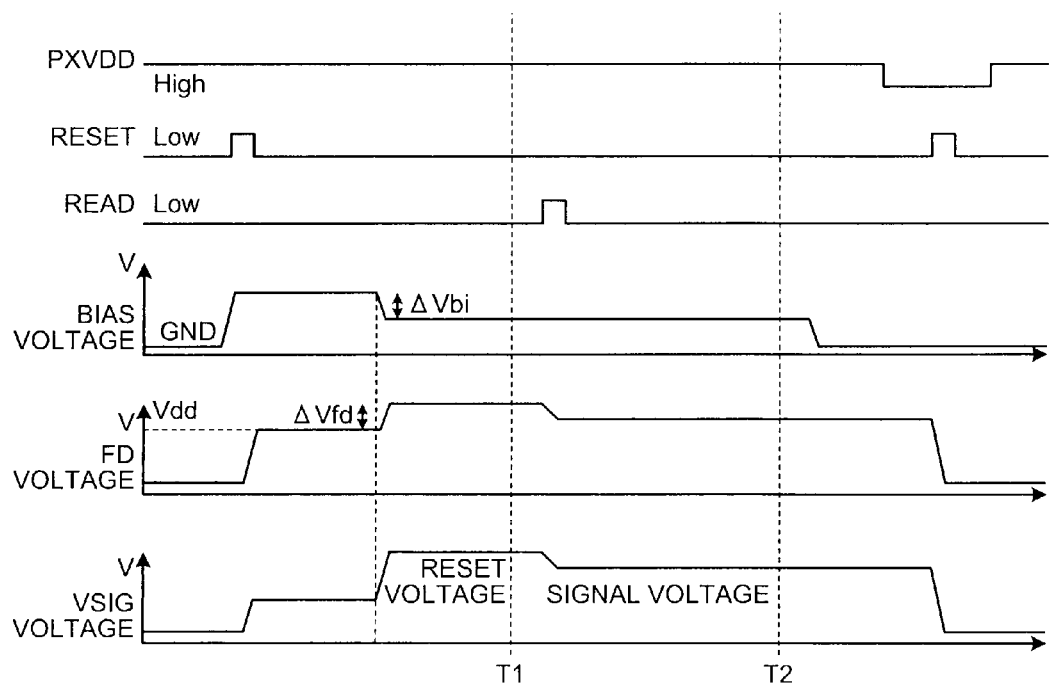
FIG. 16 is an example of a timing chart of a pixel signal read operation in the solid-state imaging device according to the fourth embodiment.

FIG. 16 is an example of a timing chart of a pixel signal read operation in the solid-state imaging device according to the fourth embodiment. The pixel signal read operation in the solid-state imaging device is explained below with reference to FIG. 16.

When the pixel signal is read in the solid-state imaging device according to the fourth embodiment, the power supply voltage is first applied to the pixel power supply (PXVDD), and the bias voltage is applied to the load transistor 21 in the load circuit 20d. It is assumed that the bias voltage to be applied here has a higher value by a predetermined amount ($\Delta$Vbi) than the bias voltage applied to the load transistor 21 in the pixel signal read circuit shown in FIG. 2 explained in the first embodiment. If the reset transistor 14 is turned on for a predetermined period in this state, the voltage of the FD increases to finally become the power supply voltage (Vdd) applied to the pixel power supply. Further, the current flows into the source follower, and a voltage value shifted by a certain amount from the voltage (Vdd) set to the FD 12 is output to the VSIG.

Because a voltage higher than a normal bias voltage (the bias voltage applied to the load transistor 21 in the pixel signal read circuit shown in FIG. 2) is applied to the load transistor 21, a larger current flows into the source follower than in the pixel signal read circuit shown in FIG. 2. Accordingly, as in the above embodiments, the voltage of the vertical signal line (VSIG voltage) becomes lower than the normal voltage (the voltage in the pixel signal read circuit shown in FIG. 2).

After the voltage of the FD 12 is set as Vdd, the load circuit controller 30d decreases the bias voltage applied to the load transistor 21 by a predetermined amount ($\Delta$Vbi). The current flowing into the source follower then decreases, thereby increasing the voltage of the vertical signal line (VSIG voltage shown in FIG. 16). The voltage after the increase (reset voltage) is sampled by a sample-and-hold circuit (corresponding to the sample-and-hold circuit 41 shown in FIG. 1) at the timing T1.

Operations thereafter are the same as those of the solid-state imaging devices according to the first, second, and third embodiments. That is, after the sampling of the reset voltage has finished, the read transistor 13 is turned on to transfer the signal charges accumulated in the photodiode 11 to the FD 12. Accompanying this, the signal voltage output to the vertical signal line is sampled at the timing T2. After sampling of the signal voltage has finished, the load transistor 21 is turned off (the bias voltage is decreased to GND, which is the reference potential), to cut the current flowing into the source follower, the pixel power supply (PXVDD) is decreased to the low level, and the reset transistor 14 is turned on in this state, thereby turning off the amplifier transistor 15.

As described above, in the solid-state imaging device according to the fourth embodiment, when the FD is reset, the voltage applied to the load transistor is increased than normal so that a larger current than normal (than conventional techniques) flows into the source follower, to increase the voltage of the FD to the power supply source. The voltage to be applied to the load transistor is then returned to the normal value to decrease the current flowing into the source follower to a current value same as normal, thereby increasing the voltage value output to the vertical signal line, so that the voltage of the FD (reset voltage) is increased than the power supply voltage. Accordingly, the fourth embodiment can achieve identical effects as those of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing apparatus that generates a voltage signal corresponding to electric charges accumulated in a photodiode in a pixel cell in a correlated double sampling process, wherein the signal processing apparatus comprises:
    a floating diffusion (FD) for converting the accumulated electric charges to a voltage signal; and
    a transistor in which a gate terminal is connected to the FD and a source terminal is connected to an output signal line, and
    when the FD is reset in the correlated double sampling process, a power supply voltage is applied to the FD for a predetermined period to set a voltage of the output signal line as a first voltage, and thereafter, the set voltage of the output signal line is set as a second voltage higher than the first voltage, and as a configuration for controlling the set voltage of the output signal line, the signal processing apparatus comprises:

a load transistor in which a bias voltage is input to a gate terminal and a drain terminal is connected to the output signal line; and a switching transistor serially connected to the load transistor, in which a source terminal is connected to a reference potential point, and in a reset process of the FD, a power supply voltage is applied to the FD for a predetermined period in a state that the switching transistor is turned on and the bias voltage is set as a first bias voltage to turn on the load transistor, thereby setting the set voltage of the output signal line as the first voltage, and thereafter, the bias voltage is set as a second bias voltage lower than the first bias voltage and capable of maintaining an on state of the load transistor in a state that the switching transistor is turned on, thereby setting the set voltage of the output signal line as the second voltage.

2. A signal processing apparatus that generates a voltage signal corresponding to electric charges accumulated in a photodiode in a pixel cell in a correlated double sampling process, wherein the signal processing apparatus comprises:

a floating diffusion (FD) for converting the accumulated electric charges to a voltage signal; and a transistor in which a gate terminal is connected to the FD and a source terminal is connected to an output signal line, and when the FD is reset in the correlated double sampling process, a power supply voltage is applied to the FD for a predetermined period to set a voltage of the output signal line as a first voltage, and thereafter, the set voltage of the output signal line is set as a second voltage higher than the first voltage, and as a configuration for controlling the set voltage of the output signal line, the signal processing apparatus comprises:

two load transistors in which a bias voltage is input to a gate terminal and a drain terminal is connected to the output signal line; and two switching transistors serially connected in a one-to-one manner to either one of the load transistors, in which a gate terminal is input with a switching signal and a source terminal is connected to a reference potential point, and in the reset process of the FD, a power supply voltage is applied to the FD for a predetermined period in a state that the respective load transistors and switching transistors are turned on, thereby setting the set voltage of the output signal line as the first voltage, and thereafter, either one of the switching transistors is turned off, thereby setting the set voltage of the output signal line as the second voltage.

3. A signal processing apparatus that generates a voltage signal corresponding to electric charges accumulated in a photodiode in a pixel cell in a correlated double sampling process, wherein the signal processing apparatus comprises:

a floating diffusion (FD) for converting the accumulated electric charges to a voltage signal; and a transistor in which a gate terminal is connected to the FD and a source terminal is connected to an output signal line, and when the FD is reset in the correlated double sampling process, a power supply voltage is applied to the FD for a predetermined period to set a voltage of the output signal line as a first voltage, and thereafter, the set voltage of the output signal line is set as a second voltage higher than the first voltage, and as a configuration for controlling the set voltage of the output signal line, the signal processing apparatus comprises:

two load transistors in which a bias voltage is input to a gate terminal, a drain terminal is connected to the output signal line, and a source terminal is connected to a reference potential point, and in the reset process of the FD, a power supply voltage is applied to the FD for a predetermined period in a state that the respective load transistors are turned on, thereby setting the set voltage of the output signal line as the first voltage, and thereafter, either one of the load transistors is turned off, thereby setting the set voltage of the output signal line as the second voltage.

4. A signal processing apparatus that generates a voltage signal corresponding to electric charges accumulated in a photodiode in a pixel cell in a correlated double sampling process, wherein the signal processing apparatus comprises:

a floating diffusion (FD) for converting the accumulated electric charges to a voltage signal; and a transistor in which a gate terminal is connected to the FD and a source terminal is connected to an output signal line, and when the FD is reset in the correlated double sampling process, a power supply voltage is applied to the FD for a predetermined period to set a voltage of the output signal line as a first voltage, and thereafter, the set voltage of the output signal line is set as a second voltage higher than the first voltage, and as a configuration for controlling the set voltage of the output signal line, the signal processing apparatus comprises:

a load transistor in which a bias voltage is input to a gate terminal, a drain terminal is connected to the output signal line, and a source terminal is connected to a reference potential point, and in the reset process of the FD, a power supply voltage is applied to the FD for a predetermined period in a state that the bias voltage is set as a first bias voltage to turn on the load transistor, thereby setting the set voltage of the output signal line as the first voltage, and thereafter, the bias voltage is set as a second bias voltage lower than the first bias voltage and capable of maintaining an on state of the load transistor, thereby setting the set voltage of the output signal line as the second voltage.

5. A solid-state imaging device comprising a plurality of pixel cells arranged in an array, a load circuit connected to each of the pixel cells, and a row selecting circuit that selects a pixel cell to be processed from the pixel cells, wherein each of the pixel cell includes:

a photodiode;

an FD for converting electric charges accumulated in the photodiode to a voltage signal;

an amplifier transistor in which a gate terminal is connected to the FD and a source terminal is connected to an output signal line; and a reset transistor in which a source terminal is connected to the FD, and in a reset process of the FD at a time of performing a correlated double sampling process, a power supply voltage is applied to the FD for a predetermined period by controlling the reset transistor to set a voltage of the output signal line as a first voltage, and thereafter, the set voltage of the output signal line is set as a second voltage higher than the first voltage by controlling the load circuit.

6. The solid-state imaging device according to claim 5, wherein the load circuit includes:

a load transistor in which a bias voltage is input to a gate terminal and a drain terminal is connected to the output signal line; and a switching transistor serially connected to the load transistor, in which a source terminal is connected to a reference potential point, and in the reset process of the FD, a power supply voltage is applied to the FD for a predetermined period in a state that the switching transistor is turned on and the bias voltage is set as a first bias voltage to turn on the load transistor, thereby setting the set voltage of the output signal line as the first voltage, and thereafter, the bias voltage is set as a second bias voltage lower than the first bias voltage and capable of maintaining an on state of the load transistor in a state with the switching transistor turned on, thereby setting the set voltage of the output signal line as the second voltage.

7. The solid-state imaging device according to claim 5, wherein the load circuit includes:

two load transistors in which a bias voltage is input to a gate terminal and a drain terminal is connected to the output signal line; and two switching transistors serially connected in a one-to-one manner to either one of the load transistors, in which a gate terminal is input with a switching signal and a source terminal is connected to a reference potential point, and in the reset process of the FD, a power supply voltage is applied to the FD for a predetermined period in a state that the respective load transistors and switching transistors are turned on to set the set voltage of the output signal line as the first voltage, and thereafter, either one of the switching transistors is turned off, thereby setting the set voltage of the output signal line as the second voltage.

8. The solid-state imaging device according to claim 5, wherein the load circuit includes:

two load transistors in which a bias voltage is input to a gate terminal, a drain terminal is connected to the output signal line, and a source terminal is connected to a reference potential point, and in the reset process of the FD, a power supply voltage is applied to the FD for a predetermined period in a state that the respective load transistors are turned on to set the set voltage of the output signal line as the first voltage, and thereafter, either one of the load transistors is turned off, thereby setting the set voltage of the output signal line as the second voltage.

9. The solid-state imaging device according to claim 5, wherein the load circuit includes:

a load transistor in which a bias voltage is input to a gate terminal, a drain terminal is connected to the output signal line, and a source terminal is connected to a reference potential point, and in the reset process of the FD, a power supply voltage is applied to the FD for a predetermined period in a state that the bias voltage is set as a first bias voltage to turn on the load transistor, thereby setting the set voltage of the output signal line as the first voltage, and thereafter, the bias voltage is set as a second bias voltage lower than the first bias voltage and capable of maintaining an on state of the load transistor, thereby setting the set voltage of the output signal line as the second voltage.

10. A pixel signal generating method when a voltage signal corresponding to electric charges accumulated in a photodiode in a pixel cell is generated, the pixel signal generating method comprising:

setting a voltage of a source terminal of a transistor as a first voltage, whose gate terminal is connected to an FD for converting the accumulated electric charges to a voltage signal, by applying a power supply voltage to the FD for a predetermined period;

applying a second voltage higher than the first voltage to the source terminal of the transistor;

transferring signal charges accumulated in the photodiode to the FD; and generating a pixel signal indicating a difference between the second voltage and the voltage of the source terminal of the transistor after performing the transferring, and at the applying, a state of a load circuit connected to the source terminal is changed to set a voltage applied to the source terminal as the second voltage.

11. The pixel signal generating method according to claim 10, wherein when the load circuit includes a load transistor in which a bias voltage is input to a gate terminal and a drain terminal is connected to an output signal line, and a switching transistor serially connected to the load transistor, in which a source terminal is connected to a reference potential point, at the setting, a power supply voltage is applied to the FD for a predetermined period in a state that the switching transistor is turned on and the bias voltage applied to the gate terminal is set as a first bias voltage capable of turning on the load transistor, and at the applying, the bias voltage applied to the gate terminal is set as a second bias voltage lower than the first bias voltage and capable of maintaining an on state of the load transistor in a state that the switching transistor is turned on.

12. The pixel signal generating method according to claim 10, wherein when the load circuit includes two load transistors in which a bias voltage is input to a gate terminal and a drain terminal is connected to an output signal line, and two switching transistors serially connected in a one-to-one manner to either one of the load transistors, in which a gate terminal is input with a switching signal and a source terminal is connected to a reference potential point, at the setting, a power supply voltage is applied to the FD for a predetermined period in a state that the respective load transistors and switching transistors are turned on, and at the applying, either one of the switching transistors is turned off.

13. The pixel signal generating method according to claim 10, wherein when the load circuit includes two load transistors in which a bias voltage is input to a gate terminal, a drain terminal is connected to an output signal line, and a source terminal is connected to a reference potential point, at the setting, a power supply voltage is applied to the FD for a predetermined period in a state that the respective load transistors are turned on, and at the applying, either one of the load transistors is turned off.

14. The pixel signal generating method according to claim 10, wherein when the load circuit includes a load transistor in which a bias voltage is input to a gate terminal, a drain terminal is connected to an output signal line, and a source terminal is connected to a reference potential point, at the setting, a power supply voltage is applied to the FD for a predetermined period in a state that the bias voltage applied to the gate terminal is set as a first bias voltage capable of turning on the load transistor, and at the applying, the bias voltage applied to the gate terminal is set as a second bias voltage lower than the first bias voltage and capable of maintaining an on state of the load transistor.

* * * * *